United States Patent
Kim

(10) Patent No.: US 12,105,883 B2
(45) Date of Patent: Oct. 1, 2024

(54) FORCE FEEDBACK CONTROL APPARATUS AND CONTROL METHOD FOR SAME

(71) Applicant: POSTECH RESEARCH AND BUSINESS DEVELOPMENT FOUNDATION, Pohang-si (KR)

(72) Inventor: Keehoon Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/320,096

(22) Filed: May 18, 2023

(65) Prior Publication Data
US 2024/0134458 A1 Apr. 25, 2024
US 2024/0231496 A9 Jul. 11, 2024

(30) Foreign Application Priority Data

Oct. 24, 2022 (KR) .................. 10-2022-0137771

(51) Int. Cl.
*G06F 3/01* (2006.01)

(52) U.S. Cl.
CPC .................. *G06F 3/016* (2013.01)

(58) Field of Classification Search
CPC . A63B 21/002; A63B 21/0058; A63B 21/078; A63B 21/151; A63B 21/153; A63B 21/156; A63B 21/225; A63B 21/4001; A63B 24/0087; A63B 71/0622; A63B 2071/063; A63B 2071/0658; A63B 2071/0677; A63B 2071/068; A63B 2071/0683; A63B 21/0023; A63B 2220/10; A63B 2220/24; A63B 2220/54; A63B 2220/72; A63B 2220/75; A63B 2220/805; A63B 2220/806; A63B 2220/808; A63B 2225/20; A63B 2225/50; A63B 2230/04; A63B 2230/06; A63B 2230/207; A63B 2230/42; A61B 34/71; G06F 3/016; G06F 3/0338; G06F 3/038; G06F 3/04815; G06F 2203/015
See application file for complete search history.

(56) References Cited

U.S. PATENT DOCUMENTS

| | | | |
|---|---|---|---|
| 7,753,642 B2 * | 7/2010 | Bosscher | E04G 21/0418 414/735 |
| 9,050,527 B2 * | 6/2015 | Loose | G07F 17/3209 |
| 2012/0019440 A1 * | 1/2012 | Berkley | G06F 3/016 345/156 |

FOREIGN PATENT DOCUMENTS

KR 20100107231 A 10/2010

* cited by examiner

*Primary Examiner* — Nelson M Rosario

(57) ABSTRACT

The present disclosure relates to a cable-based force feedback control apparatus capable of automatically determining the unspecified number and positions of cable haptic apparatus and performing force feedback control based on the determination result and a control method for the apparatus. A force feedback control apparatus and a control method for the apparatus according to the present disclosure may freely change the number and positions of haptic modules, may be installed according to various screen sizes, and may automatically detect the number and positions of the haptic devices, thereby achieving scalability.

17 Claims, 21 Drawing Sheets

FORCE FEEDBACK CONTROL APPARATUS AND CONTROL METHOD FOR SAME

CROSS-REFERENCE TO RELATED APPLICATIONS

This application claims benefit of priority to Korean Patent Application No. 10-2022-0137771 filed on Oct. 24, 2022, in the Korean Intellectual Property Office, the disclosure of which is incorporated herein by reference in its entirety.

BACKGROUND

Field

The present disclosure relates to a force feedback control apparatus and a control method for the same and, more particularly, to a haptic apparatus capable of providing force feedback to a user interface device using a cable and a control method for the apparatus.

Related Art

Various forms of user interface devices to manipulate proxies in a virtual environment have been developed. Among various types of interface devices, a cable-based drive device is known to have superior effects than an interface device based on a conventional link structure. In particular, the cable-based interface device has many advantages, including quick delivery of force feedback to the user due to its low inertia and the ability to operate in a more compact installation space.

The Korea laid-open patent No. 10-2010-0107231 discloses a conventional cable-based haptic drive apparatus.

However, a problem with the conventional cable-based haptic drive apparatus is that it may not be extended and applied to various types of equipment since haptic control is based on a predetermined number and positions of haptic apparatus.

SUMMARY

To solve the problem of the conventional cable-based haptic apparatus, the present disclosure provides a force feedback control apparatus capable of automatically determining the unspecified number and positions of cable haptic apparatus and performing force feedback control based on the determination result and a control method for the apparatus.

An object of the present disclosure is to provide a force feedback control apparatus comprising a plurality of cable driving modules composed of at least three modules configured to wind a portion of a cable around one side and adjust the tension of the cable pulled out, a user interface device configured to be connected to the end of each cable pulled out from the plurality of cable driving modules, and a controller determining the number and positions of the cable driving modules based on a pull-out value from each of the cable driving modules when the position of the user interface device is moved by the user's operation.

Meanwhile, the plurality of cable driving modules may include a fixing unit configured to be attached to an arbitrary external structure by the user.

Meanwhile, the controller may change parameters for force feedback according to the determined number and positions of the cable driving modules.

Also, the controller may control a driving unit for adjusting the tension of each cable driving module based on the changed parameters.

Further, the controller may be configured to transmit position information of the user interface device to a virtual reality implementation unit based on the parameters and a value received from each of the cable driving modules.

Meanwhile, the controller may receive force feedback information calculated based on the position information of the user interface device in the virtual reality implementation unit, calculate the required tension to be generated for each of the cable driving modules based on the force feedback information, and transmit the calculated tension to each of the cable driving modules.

Also, the controller may perform, in real-time, transmission of position information of the user interface device, reception of the force feedback information, and calculation and transmission of the required tension to be generated.

Meanwhile, each of the cable driving modules may include a first pulley configured to wind the cable, a second pulley configured to change the direction of the cable pulled out from the first pulley, a first sensor unit configured to detect a pull-out value of the cable, a second sensor unit configured to detect a pull-out direction of the cable, a motor configured to rotate the pulley, a constant torque spring configured to apply a predetermined torque to the pulley, and a communication module configured to communicate with the controller.

Meanwhile, the controller may determine the parameters based on a pull-out direction and a pull-out length of the cable based on values received from the first sensor unit and the second sensor unit.

Meanwhile, each of the cable driving modules may include an accelerometer, and the controller may determine a pull-out direction of the cable based on the direction of gravity measured by the accelerometer and a value measured by the second sensor unit.

Meanwhile, the controller may calculate two-dimensional coordinates of each of the cable driving modules or coordinates in the three-dimensional space when the plurality of cable driving modules are disposed at arbitrary positions.

Meanwhile, the user interface device may be configured to include a color sensor, and the controller may determine the coordinates of the user interface device based on a value received from the color sensor.

Additionally, according to the present disclosure, a control method for a force feedback control apparatus may be provided, the method comprising displaying a virtual reality symbol on a display apparatus, receiving information related to pull-out of a cable from each of cable driving modules when a user operates a user interface device according to the symbol, and determining the number and positions of the currently installed cable driving modules based on the information related to pull-out of the cable.

Meanwhile, the determining of the number and positions of the cable driving modules may be performed based on the number and positions of the cable driving modules disposed arbitrarily by the user.

Meanwhile, the information related to pull-out of the cable may include information on a pull-out direction and a pull-out length of the cable received from each of the cable driving modules.

Meanwhile, the pull-out direction of the cable may be determined based on information on the direction of gravity received from an accelerometer installed in the cable driving module and a value received from an angle sensor installed in the cable driving module.

Also, the control method may further comprise updating a parameter for controlling the cable driving module based on the number and positions of the cable driving modules.

Meanwhile, the control method may further comprise receiving a cable pull-out value from each of the cable driving modules as the user operates the user interface device and generating position information of the user interface device based on the parameter; and transmitting the position information to the virtual reality implementation unit.

Meanwhile, the controlling each of the cable driving modules may further include receiving force feedback information calculated by the virtual reality implementation unit according to the position information; calculating required tension for each of the cable driving modules; and controlling the cable driving modules according to the required tension.

Meanwhile, the generating of the position information of the user interface device to the adjusting the tension of each cable based on the force feedback information may be performed iteratively in real-time.

A force feedback control apparatus and a control method for the apparatus according to the present disclosure may freely change the number and positions of haptic modules, may be installed according to various screen sizes, and may automatically detect the number and positions of the haptic devices, thereby achieving scalability.

DESCRIPTION OF EXEMPLARY EMBODIMENTS

Figure 1:
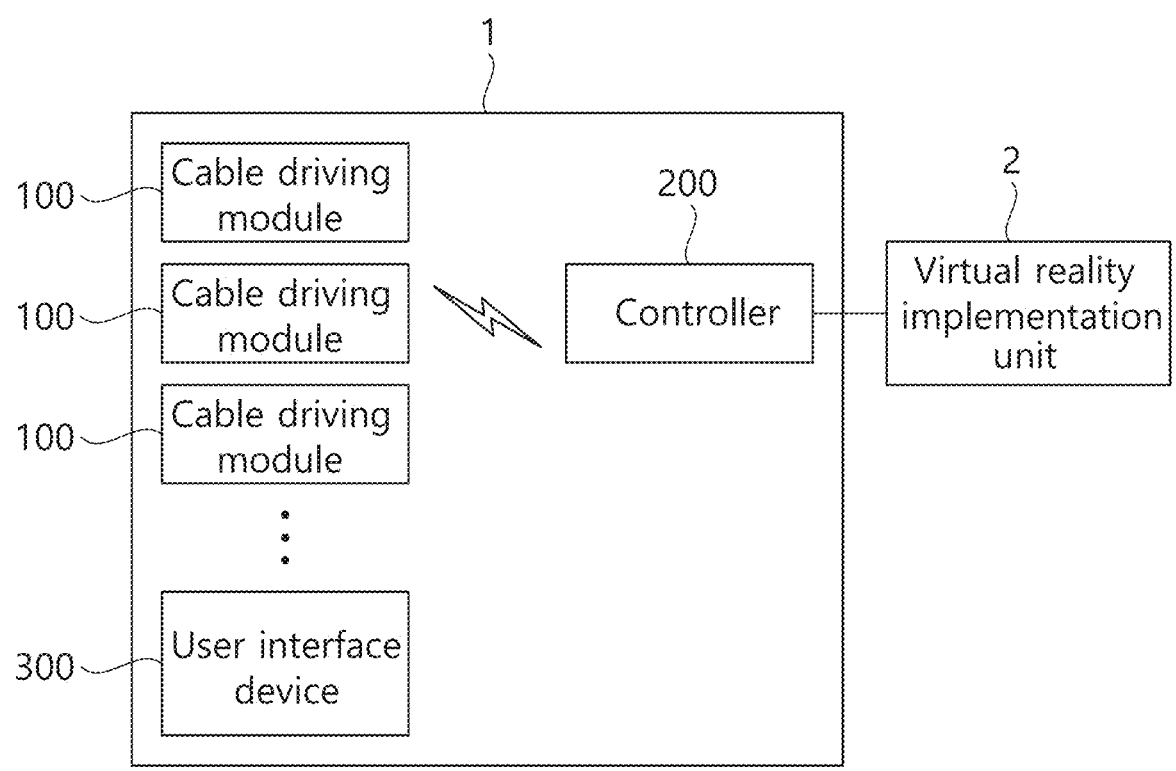
FIG. 1 is a block diagram illustrating the structure of a force feedback control apparatus according to one embodiment of the present disclosure.

In what follows, a force feedback control apparatus and a control method for the apparatus according to an embodiment of the present disclosure will be described in detail with reference to accompanying drawings. In the description of the following embodiments, the name of each constituting element may be referred to differently in the art to which the present disclosure belongs. However, if the constituting elements have functional similarity and identity, they may be regarded as forming an equivalent configuration even if a modified embodiment is employed. Meanwhile, symbols assigned to the individual constituting elements have been introduced for the convenience of description. However, it should be noted that the content illustrated by the drawings containing the symbols is not limited to the immediate scope depicted by the drawings. Likewise, even if an embodiment that partially modifies the configuration in the drawings is employed, the embodiment may be regarded as an equivalent configuration if functional similarity and identity exist. In addition, if a constituting element is regarded by those skilled in the art to which the present disclosure belongs as a basic part that should be included, the description thereof will be omitted.

In what follows, a force feedback control apparatus according to one embodiment of the present disclosure will be described with reference to FIGS. 1 to 11b.

FIG. 1 is a block diagram illustrating the structure of a force feedback control apparatus according to one embodiment of the present disclosure.

Referring to FIG. 1, a force feedback control apparatus 1 according to one embodiment of the present disclosure may include a plurality of cable driving modules 100, a controller 200, and a user interface device 300.

The plurality of cable driving modules 100 may be composed of at least three modules, where each of the cable driving modules may be configured to pull out a cable and adjust the length of the pulled-out cable. The end portions of the cables pulled out from the plurality of cable driving modules 100 are connected to each other to provide a user with force feedback formed by the sum of tensions exerted by the cables.

The controller 200 may communicate with the plurality of cable driving modules 100 to receive sensing values, determine the amount of the cable to be pulled out, and transmit a control input value for the amount of pull-out to each cable driving module 100. The controller 200 may operate in conjunction with a virtual reality implementation unit 2 installed outside, for example, a 3D simulator. The controller 200 may determine the position (position information) of the user interface device 300 based on the information received from the plurality of cable driving modules 100 and transmit the position information to the virtual reality implementation unit 2. The virtual reality implementation unit 2 may perform a real-time simulation based on the position information and transmit a force feedback value received from the physics engine to the controller 200. The controller 200 transmits a control input signal for each cable driving module 100 to adjust the pull-out length and tension of the cable based on the force feedback value received from the virtual reality implementation unit 2. When the cable driving module 100 adjusts the cable's tension, the tension exerted on each cable may finally determine the force applied to the user interface device 300.

The controller 200 may be configured to communicate with the plurality of cable driving modules 100 wirelessly, and the controller 200 may receive a sensing value, for example, a pull-out value or cable tension, from each cable driving module 100. Also, the controller 200 may be configured to determine the amount of a driving input for cable adjustment and transmit the determined amount to the cable driving module 100. The controller 200 may include a well-known processor and communication unit, and the communication unit may be configured to perform wired or wireless communication. Meanwhile, the virtual reality driving unit and the cable driving module 100 may each have a communication unit corresponding to the communication unit provided in the control unit 200.

Although the embodiment above is described based on the assumption that the controller 200 is provided separately, it should be noted that the assumption is only an example. The configuration of the controller 200 may be modified so that the controller 200 is provided for each of the plurality of cable driving modules 100, and a controller 200 installed in one of the cable driving modules 100 functions as a master controller 200 to determine the driving inputs for the remaining cable driving modules 100 and control the remaining cable driving modules 100.

Here, the user interface device 300 refers to a device that allows a user to move the position of a target object by manipulating the device or to receive force feedback through a haptic device. Specifically, the user interface device 300 is configured to be connected to the cables drawn from the plurality of cable driving modules 100 and to allow the user to input position information into virtual reality. The user interface device 300 is configured to be grabbed by the user, and when the user grabs and moves the user interface device 300, the cable's pull-out length adjusts to serve as an input to the virtual reality; also, the plurality of cable driving modules 100 may transmit the tension to the user to provide force feedback when a reactive force is to be applied from the virtual reality. The user interface device 300 may come in various shapes that a user can hold and use, including a sphere, pencil, and coin shape.

Figure 2:
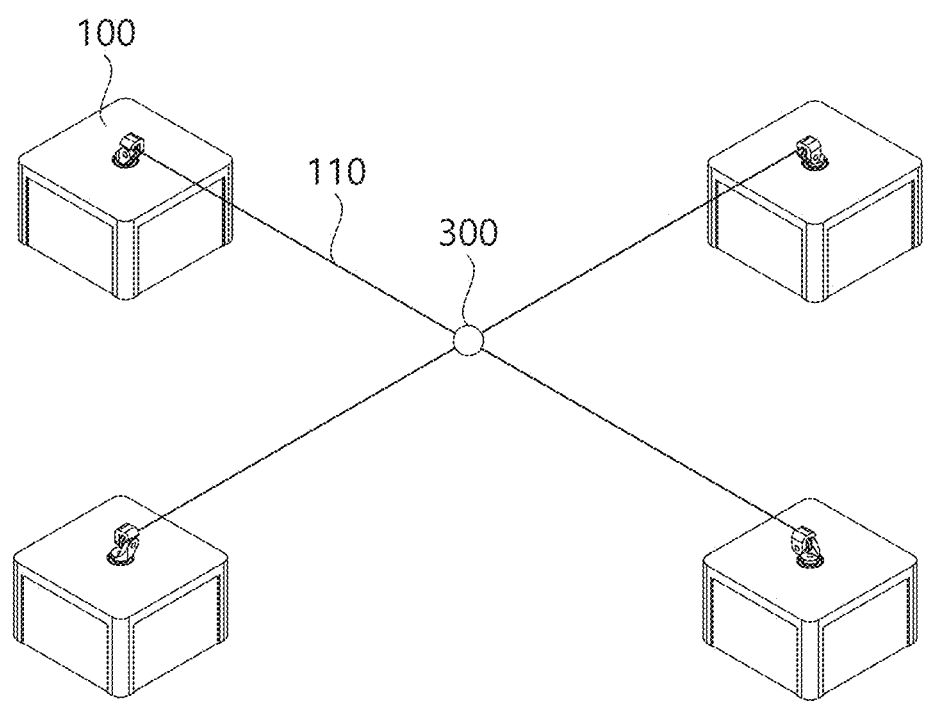
FIG. 2 is a perspective view showing a cable driving module and a user interface device in a force feedback control apparatus according to one embodiment of the present disclosure.

FIG. 2 is a perspective view showing a cable driving module and a user interface device in a force feedback control apparatus according to one embodiment of the present disclosure.

Referring to FIG. 2, according to one embodiment of the present disclosure, a plurality of cable 110 driving modules 100 may operate simultaneously to apply force feedback to one user interface device 300. The end portions of the cables 110 pulled out from the plurality of cable 110 driving modules 100 may be connected to each other, and the user interface device 300 may be placed at a point where the cables 110 are connected to each other.

Figure 3:
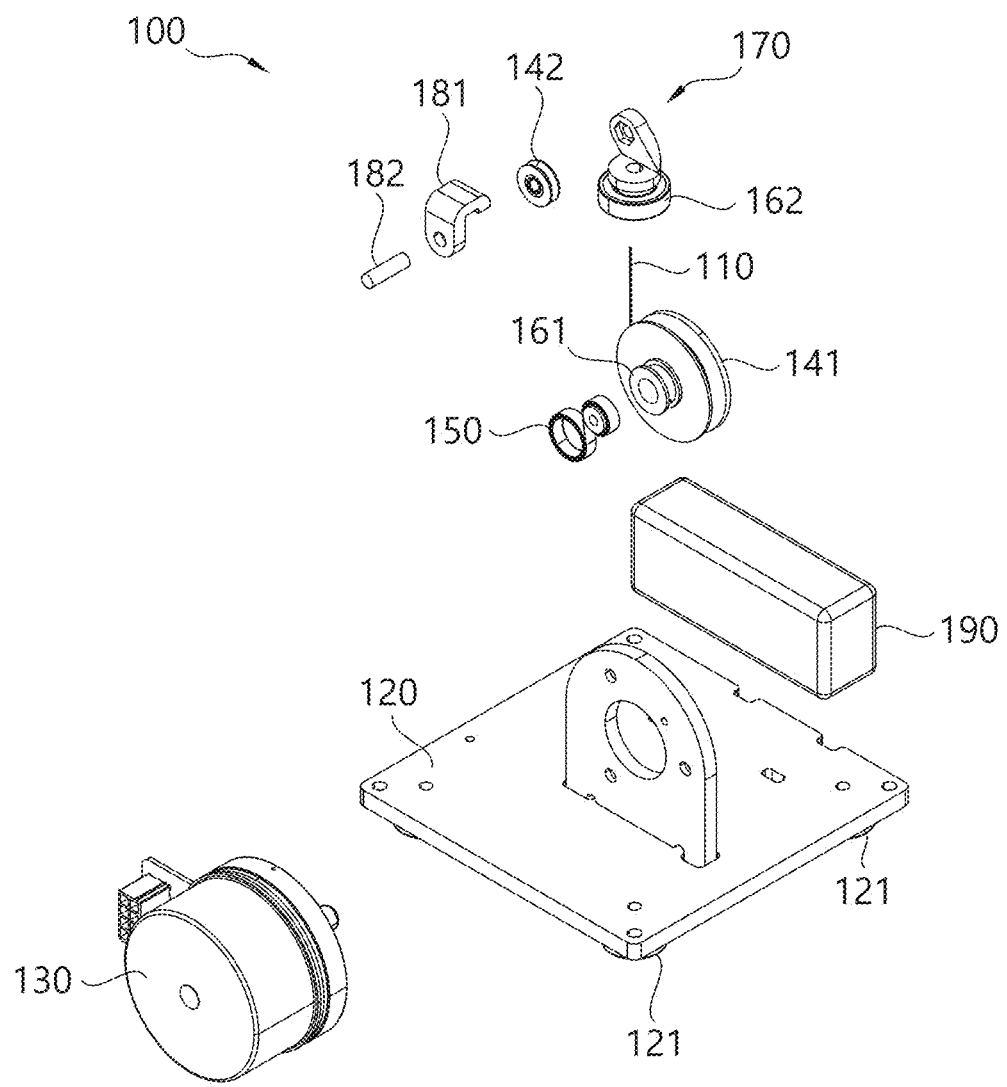
FIG. 3 is an exploded perspective view of a cable driving module applied to the present disclosure.

FIG. 3 is an exploded perspective view of a cable driving module applied to the present disclosure.

Referring to FIG. 3, the cable driving module 100 may include a housing 120, a fixing unit 121, a motor, a first pulley 141, a second pulley 142, a cable 110, a constant torque spring 150, a first angle sensor 161, a second angle sensor 162, a rotating joint 170, a guide 181, a connecting pin 182, an accelerometer, a communication unit, and a power supply.

The housing 120 is configured to contain actual driving elements of the cable driving module 100. In the present figure, only the lower portion of the housing 120 is shown for the convenience of description, and a hole is formed on one side (not shown) of the housing 120 through which the cable 110 may be pulled out. On the other hand, the housing 120 may be built to have a shape and material commonly used in the prior art.

The fixing unit 121 may be configured to be provided on the outside of the housing 120 and temporarily fixed to an external structure. The fixing unit 121 is configured to allow the cable driving module 100 to be easily secured to any desired position and readily released from that position by the user. For example, the fixing unit 121 may be configured to be attached to a bezel or panel of a monitor or attached to a large screen. For example, the fixing unit 121 may be configured to include a suction cup for attachment to a flat structure or a magnet for attachment to a metal material. It should be noted, however, that these are only examples, and the fixing unit 121 may be adapted and implemented in various configurations for attachment to an external structure.

The driving unit 130 may be configured to pull out the cable 110 and exert tension to the cable 110. The driving unit 130, which may be built using a motor, for example, may adjust the amount of cable 110 pull-out and the tension applied to the cable 110 through current control.

The first pulley 141 is configured so that the cable 110 may be wound around the first pulley 141; the first pulley 141 is configured to be connected to the driving unit 130 to receive power and rotate. The first pulley 141 is configured to adjust the pull-out length and the tension of the cable 110 by rotation when the other side of the cable 110 is connected to the user interface device.

The second pulley 142 is configured to support the cable 110 pulled out from the first pulley 141. One part of the rotating joint is installed on the outer surface of the housing 120, and the other part is connected to the second pulley 142. When the tension is applied to the pulled-out cable 110, the rotating joint is configured to rotate in the direction of the tension passively. On one side of the rotating joint, a guide 181 is installed to prevent the cable 110 from being separated from the second pulley 142, where the guide 181 may be connected to the rotating joint through a connecting pin 182.

The cable 110 may be composed of a material that actually does not stretch within the allowed use range of the force feedback control apparatus according to the present disclosure. For example, the cable 110 may be made of a metallic material with a high elasticity modulus.

The constant torque spring is configured to transmit torque to the first pulley 141 continuously. Since the tension of the cable 110 is controlled by a pulling force, the constant torque spring 150 provides a predetermined amount of torque independent of the rotation angle of the first pulley 141 to ensure a minimum required tension for fixing the cable 110. In addition, the constant torque spring 150 is provided to reduce the load due to the continuous operation of the motor to maintain the tension. Also, the constant torque spring 150 is provided to exert a constant tension to the cable 110 even in the absence of power to the motor.

The first angle sensor 161 is configured to measure the rotation angle of the first pulley 141. When the rotation angle of the first pulley is measured, the controller may determine the amount of pull-out based on the rotation angle of the first pulley 141.

The second angle sensor 162 is configured to measure the rotation angle of the rotating joint. Therefore, based on the value measured by the second angle sensor 162, the amount of pull-out of the cable 110 may be determined.

The accelerometer (not shown), the communication unit (not shown), and the power supply (not shown) may be provided within an inner box 190 to prevent contamination from the moving cable 110 and driving unit 130. When the cable driving module 100 is fixed to an external structure (for example, a screen of a display device) and stationary at the corresponding position, the accelerometer may determine the direction of gravity. Based on the value measured by the second angle sensor 162 with reference to the direction of gravity, a relative angle at which the cable 110 is currently pulled out may be determined. The communication unit may be configured to communicate with the controller through wired or wireless communication. Meanwhile, as in the modified embodiment, when controllers are provided in the respective cable driving modules 100 instead of using a central controller, the cable driving modules 100 may be configured to communicate with each other. The power supply unit is configured to supply power to the driving unit 130, the plurality of sensors, and the communication unit.

Meanwhile, since the configurations of the accelerometer, communication unit, and power supply may employ commonly used configurations, further detailed descriptions will be omitted. In addition, it should be noted that the configuration of the inner box 190 is an optional matter and may be omitted.

Figure 4:
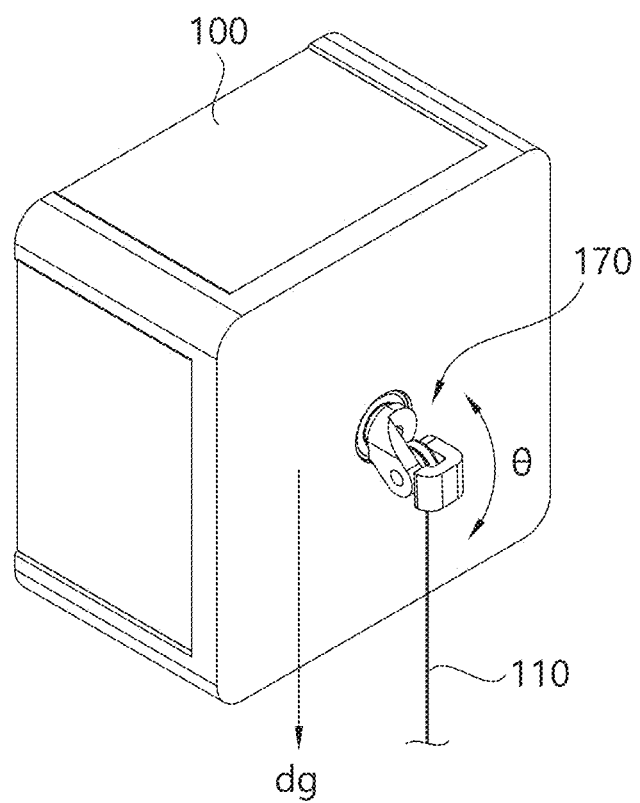
FIG. 4 shows an operating state of a cable driving module.

FIG. 4 shows an operating state of a cable driving module.

Referring to FIG. 4, the cable driving module 100 may be configured to let the cable 110 pulled out when a user adjusts the position of the user interface device while one end of the cable is connected to the user interface device, and the pull-out direction θ may be configured to be adjusted by the rotating joint 170. Meanwhile, even when the user attaches the cable driving module 100 to an external structure without aligning the direction of the cable driving module 100, the direction of gravity may still be detected by the accelerometer, and the direction of the cable 110 pulled out from the cable driving module 100 relative to the direction of gravity may be detected, the pull-out direction of the cable 110 may be finally determined based on the direction of gravity.

Figure 5:
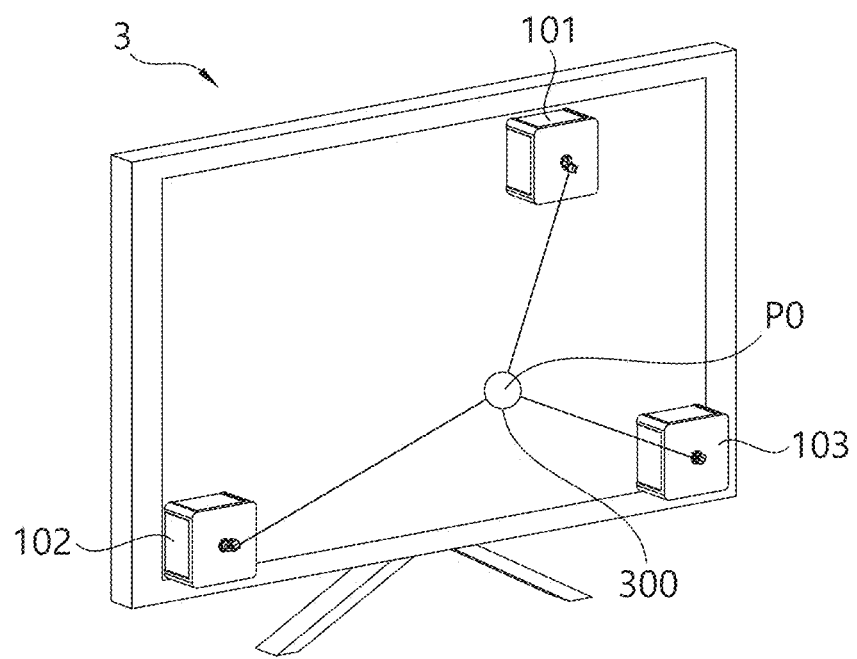
FIG. 5 shows an example in which a force feedback control apparatus according to one embodiment of the present disclosure is used.

FIG. 5 shows an example in which a force feedback control apparatus according to one embodiment of the present disclosure is used. Meanwhile, in the following drawings, constituting elements may be exaggerated or reduced for the convenience of descriptions. It should be noted that the scales of the constituting elements in the respective drawings are for illustrative purposes only, and the constituting elements may be implemented at different sizes as needed.

Referring to FIG. 5, in a force feedback control apparatus according to one embodiment of the present disclosure, the cable driving module may be attached to a display device 3 that displays a virtual reality. In other words, the user may define a space in which to move the user interface device 300 and attach the cable driving modules 101, 102, 103 to an arbitrary position along the edge of the space. At this time, the force feedback control apparatus according to the present disclosure does not require the user to install each of the cable driving modules 101, 102, 103 at an accurate position. Also, embodiments of the present disclosure do not require precise positioning of the user interface device 300. On the other hand, the controller may determine the number and positions of the cable driving modules when the user attaches the cable driving modules 101, 102, 103 at arbitrary positions, connects each cable to the user interface device, and adjusts the position P0 of the user interface device.

Figure 6:
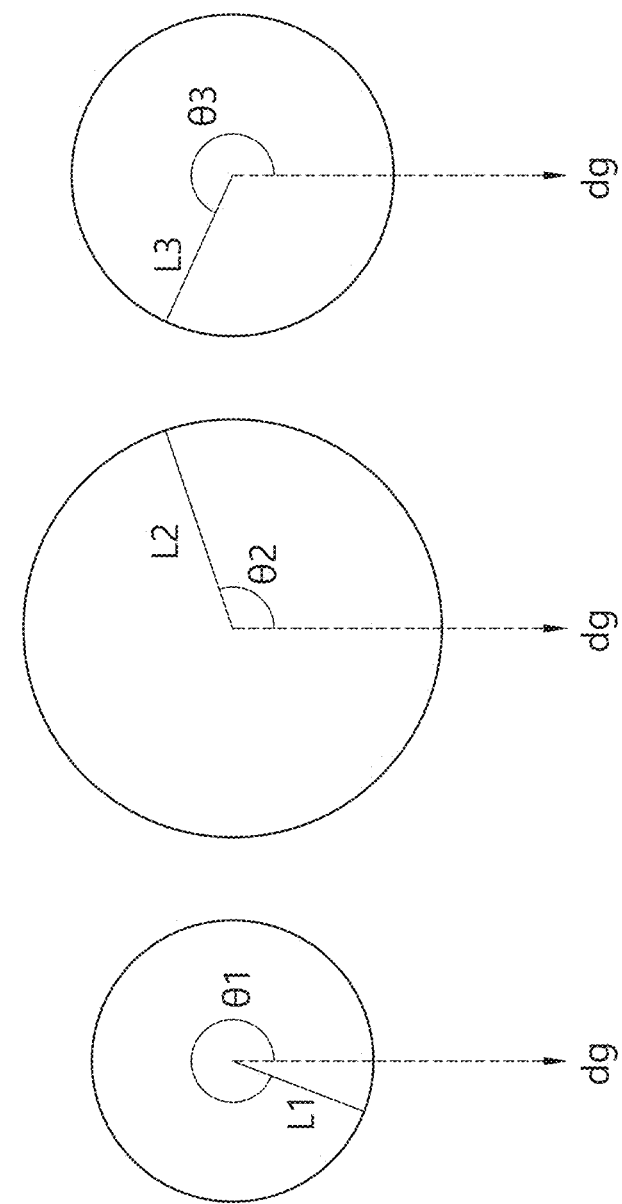
FIGS. 6 and 7 illustrate the concept of determining the number and positions of cable driving modules in a force feedback control apparatus according to one embodiment of the present disclosure.
Figure 7:
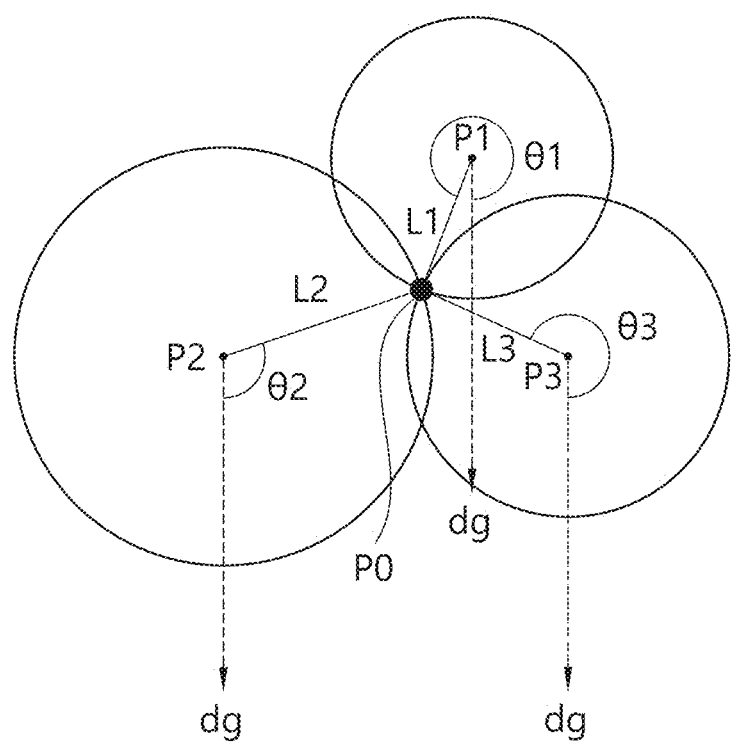

FIGS. 6 and 7 illustrate the concept of determining the number and positions of cable driving modules in a force feedback control apparatus according to one embodiment of the present disclosure.

As shown in FIG. 5, the present figures assume that the user fixes three cable driving modules 101, 102, 103 at arbitrary positions, and the cables pulled out from the respective cable driving modules are connected to one user interface device. At this time, the position P0 of the user interface device may be determined by the basic tensions exerted by the cable driving modules. Meanwhile, the number of cable driving modules may be determined by received signals. At this time, when wireless communication is used, the controller may determine the number of cable driving modules based on packet information transmitted and received to and from the cable driving modules.

Referring to FIG. 6, each cable driving module may determine the pull-out length of the cable based on a value measured by the first angle sensor. Also, based on the values measured by the second angle sensor and the accelerometer, the pull-out angle of the cable may be determined.

For example, the length L1 of a cable pulled out from the first cable driving module 101 of FIG. 5 is determined, and the pull-out angle $θ_1$ of the cable is determined based on the direction of gravity dg. Similarly, from the second cable driving module 102 and the third cable driving module 103 of FIG. 5, the pull-out lengths L2, L3 of the cables are determined, and the pull-out angles $θ_2$, $θ_3$ of the cables are determined based on the direction of gravity.

Referring to FIG. 7, based on the lengths L1, L2, L3 and pull-out directions $θ_1$, $θ_2$, $θ_3$ of the cables pulled out from the respective cable driving modules, the position at which the end portions of the respective cables meet, namely, the position P0 of the user interface device, is calculated. After the position P0 of the user interface device is determined, the position P1 of the first cable driving module 101, the position P2 of the second cable driving module 102, and the position of the third cable driving module 103 may be calculated inversely based on the user interface device's position. At this time, coordinates of the first 101 to third cable driving modules 103 may be determined based on the pull-out lengths L1, L2, L3 and pull-out directions $θ_1$, $θ_2$, $θ_3$ of the cables.

Afterward, the controller performs force feedback control of the cable based on the installation positions of the first 101 to third cable driving modules 103. At this time, the controller receives force feedback information applied according to the position of the user interface device 300 moved by the user from the virtual reality implementation unit and calculates the tension to be distributed among the cables.

Specifically, as shown in FIGS. 6 and 7, the controller initially determines the positions P1, P2, P3 of the plurality of cable driving modules and then updates related parameters; when the user moves the user interface device using the updated parameter, the controller calculates the current position of the user interface device. Afterward, the controller transmits the position information to the virtual reality implementation unit and receives a force feedback signal within the virtual reality implementation unit. Then, the controller determines the amount of driving input for each cable driving module to apply the required force feedback to the user interface device based on the parameters.

Figure 8:
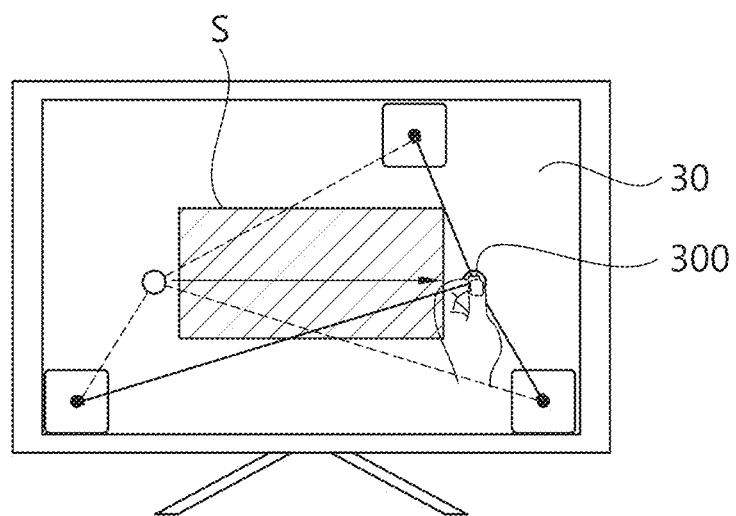
FIG. 8 shows an operating state illustrating a process of performing scale adjustment between a force feedback control apparatus and virtual reality according to one embodiment of the present disclosure.

FIG. 8 shows an operating state illustrating a process of performing scale adjustment between a force feedback control apparatus and virtual reality according to one embodiment of the present disclosure.

After the installation positions of the plurality of cable driving modules are identified, a scale problem may occur. In other words, it may be necessary to adjust the scale between the distance that an actual user moves the user interface device 300 and the distance that the user interface device moves in the virtual reality. In this case, as shown in FIG. 8, a value received using a color sensor (RGB sensor) included in the user interface device 300 may be used. The color sensor may be installed to face the display when the user interface device 300 is installed, namely, the direction facing the user.

Meanwhile, the virtual reality implementation unit may display a specific symbol S on the screen 30. As shown in FIG. 8, the specific symbol S may be a simple rectangle. While moving the user interface device 300 along the corresponding symbol S, the user may check information on the coordinates of the user interface device on the actual screen. In other words, the controller may change the parameter for scale adjustment based on the value received from the color sensor and the position information of the user interface device 300. As described above, when the controller completes the initial setting and updates the parameter, the actual position of the user interface device 300 moved by the user and the position of the proxy displayed on the screen may be synchronized.

Figure 9:
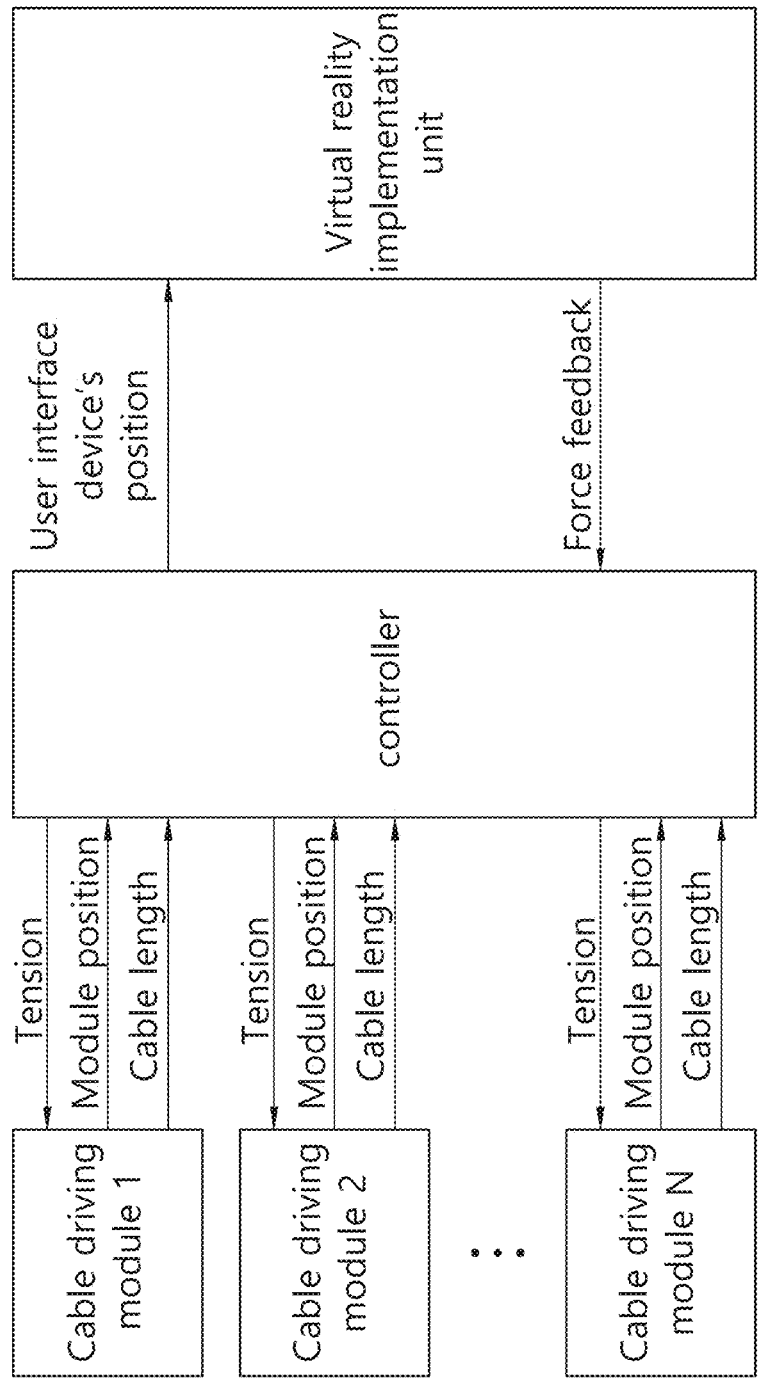
FIG. 9 is a block diagram illustrating a data flow in a force feedback control apparatus according to one embodiment of the present disclosure.

FIG. 9 is a block diagram illustrating a data flow in a force feedback control apparatus according to one embodiment of the present disclosure.

FIG. 9 shows a data flow after the controller updates the parameter based on the number and positions of cable driving modules. After the initial parameter is updated, the controller determines the position of the user interface device based on the cable pull-out value received from each cable driving module as the user adjusts the position of the user interface device and transmit the determined position to the virtual reality implementation unit. Afterward, the virtual reality implementation unit transmits, to the controller, force feedback information according to the position information of the user interface device received from the controller within the virtual reality. The controller determines the tension to be applied to each cable driving module based on the force feedback information and transmits the determined tension information to each cable driving module. Afterward, the cable driving modules generate the tension by driving their driving unit based on the received control input.

Figure 10A:
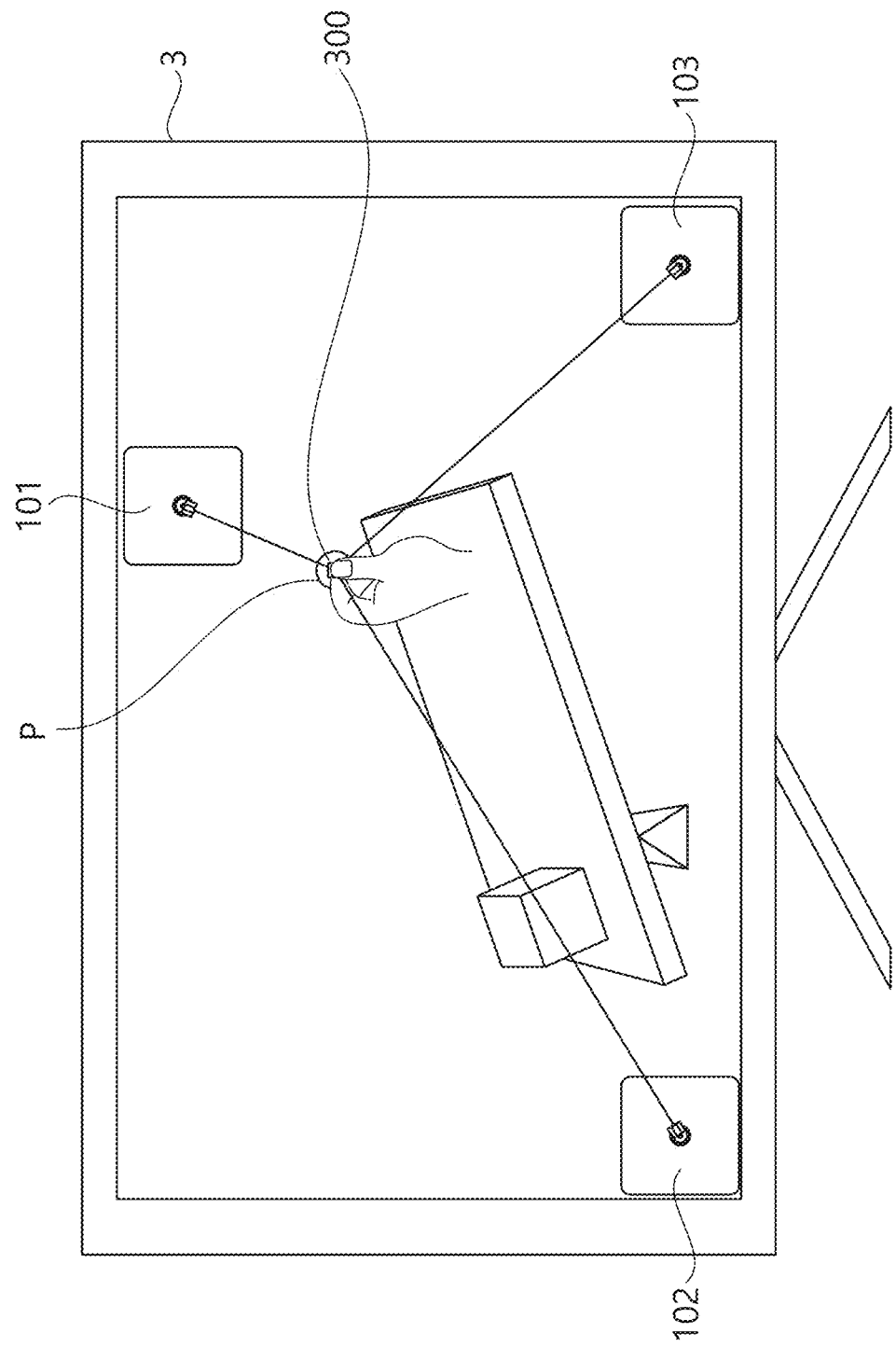
FIGS. 10a and 10b illustrate the concept of force feedback performed in a force feedback control apparatus according to one embodiment of the present disclosure.
Figure 10B:
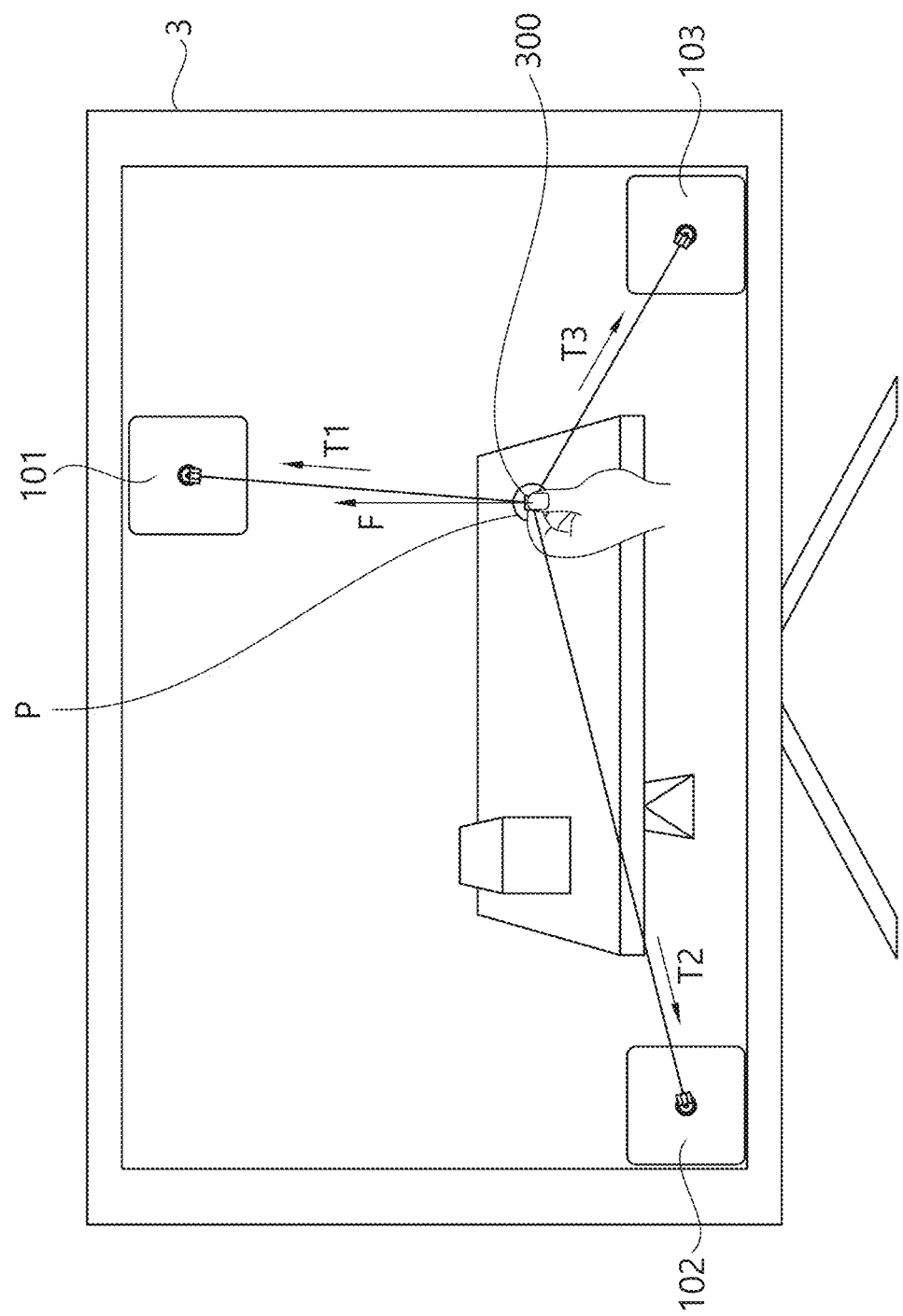

FIGS. 10a and 10b illustrate the concept of force feedback performed in a force feedback control apparatus according to one embodiment of the present disclosure.

Referring to FIGS. 10a and 10b, as one example in which force feedback is applied in a virtual space, a lever model having an object on one side is shown. At this time, if the laws of physics are applied in the virtual space, and the other side of the lever is pressed downward, the user senses an upward force due to virtual gravity.

In the configuration shown in FIG. 10a, a proxy P is in a free space; if the weight of the proxy P is not set, no force is exerted on the proxy P in the virtual reality space.

However, as shown in FIG. 10b, when the user moves the user interface device 300 downward to place one side of the lever at a pressing position, the proxy P is made to move in the virtual space; Upon being pressed, the lever generates force feedback. At this time, the virtual reality implementation unit transmits the force feedback information to the controller; the controller then determines the required tension T1, T2, T3 for each of the three cable driving modules 101, 102, 103 and generates control input. At this time, the controller may determine the required tension using a simple two-dimensional vector operation. In other words, since the position of the user interface device 300 and the direction of each cable have been determined, the controller calculates the tension T1, T2, T3 of each cable to generate force feedback and delivers control input to drive each cable driving module.

Eventually, the sum F of tensions generated by the respective cables is applied to the user interface device 300 to implement a haptic function. The operation of the controller and cable driving modules utilizing force feedback may be performed in real-time.

Figure 11A:
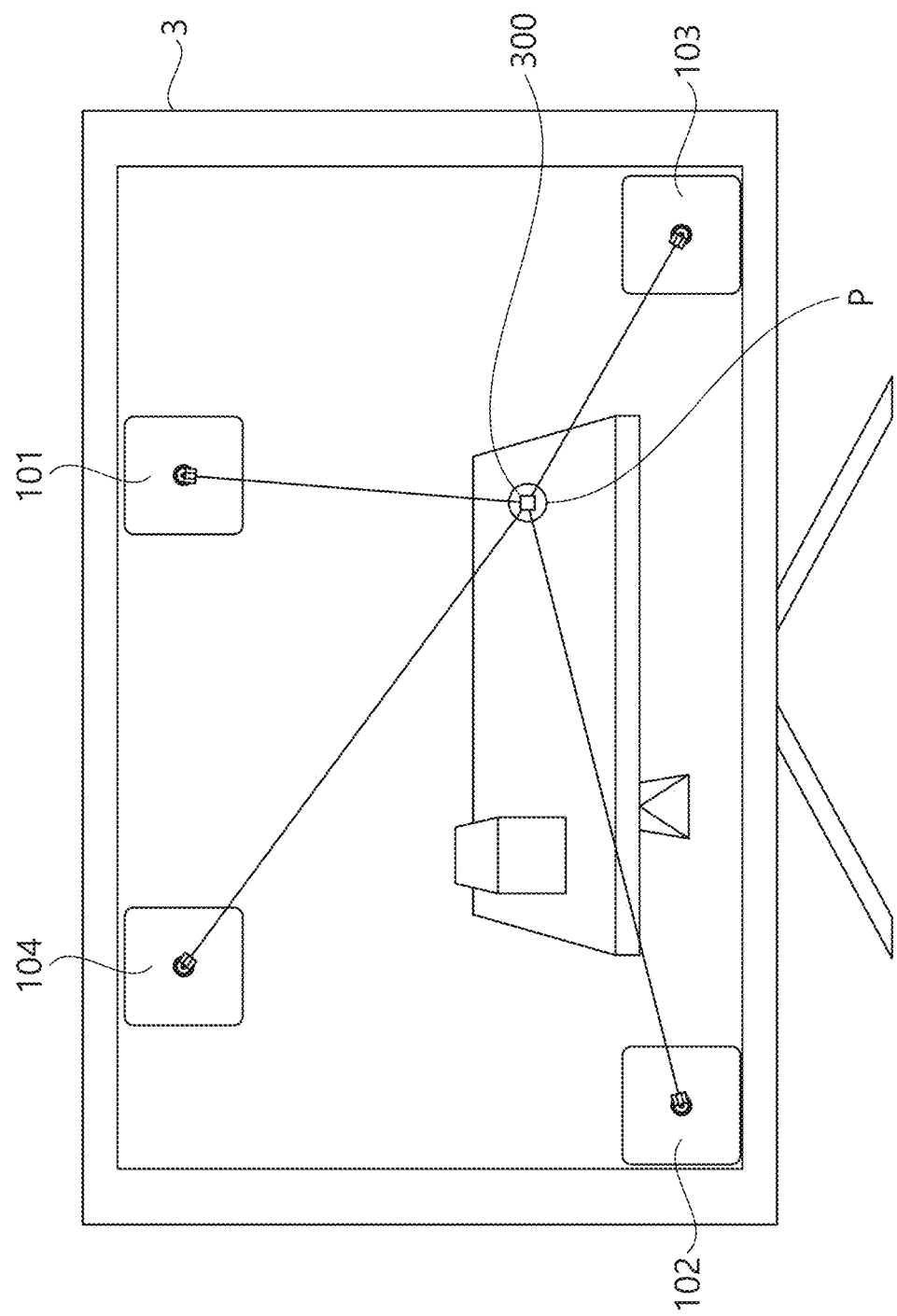
FIGS. 11a and 11b illustrate an example in which the number and installation positions of cable driving modules are changed in a force feedback control apparatus according to one embodiment of the present disclosure.
Figure 11B:
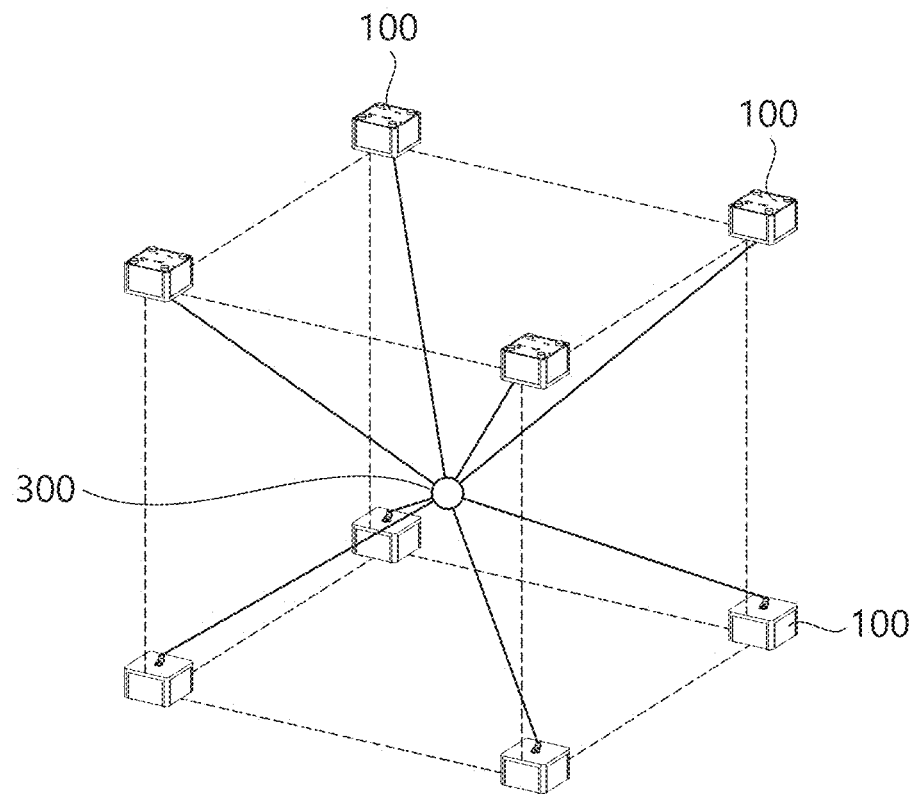

FIGS. 11a and 11b illustrate an example in which the number and installation positions of cable driving modules are changed in a force feedback control apparatus according to one embodiment of the present disclosure.

Referring to FIG. 11a, the force feedback control apparatus according to one embodiment of the present disclosure may be applied with a modified number of cable driving modules as described above. Specifically, four cable driving modules may be installed in the bezel of the display device 3. The user may further install a fourth cable driving module 104 in addition to the cable driving modules 101, 102, 103 described in FIG. 5. In this case, too, as described with reference to FIGS. 6 and 7, the number and positions of the cable driving modules may be determined by the controller even if the user does not provide information on the number and positions of the cable driving modules. Also, the controller may update a parameter for adjusting the tension to be generated for each cable driving module 101, 102, 103, 104 and generate force feedback to implement a haptic function.

Referring to FIG. 11b, the force feedback control apparatus according to one embodiment of the present disclosure may be expanded into the 3D case. In this case, the cable driving module 100 may be installed in the 3D space. Even in this case, if the user interface device 300 is moved in the 3D space, the controller may calculate information on the number and positions of the cable driving modules and then perform force feedback control.

Figure 11C:
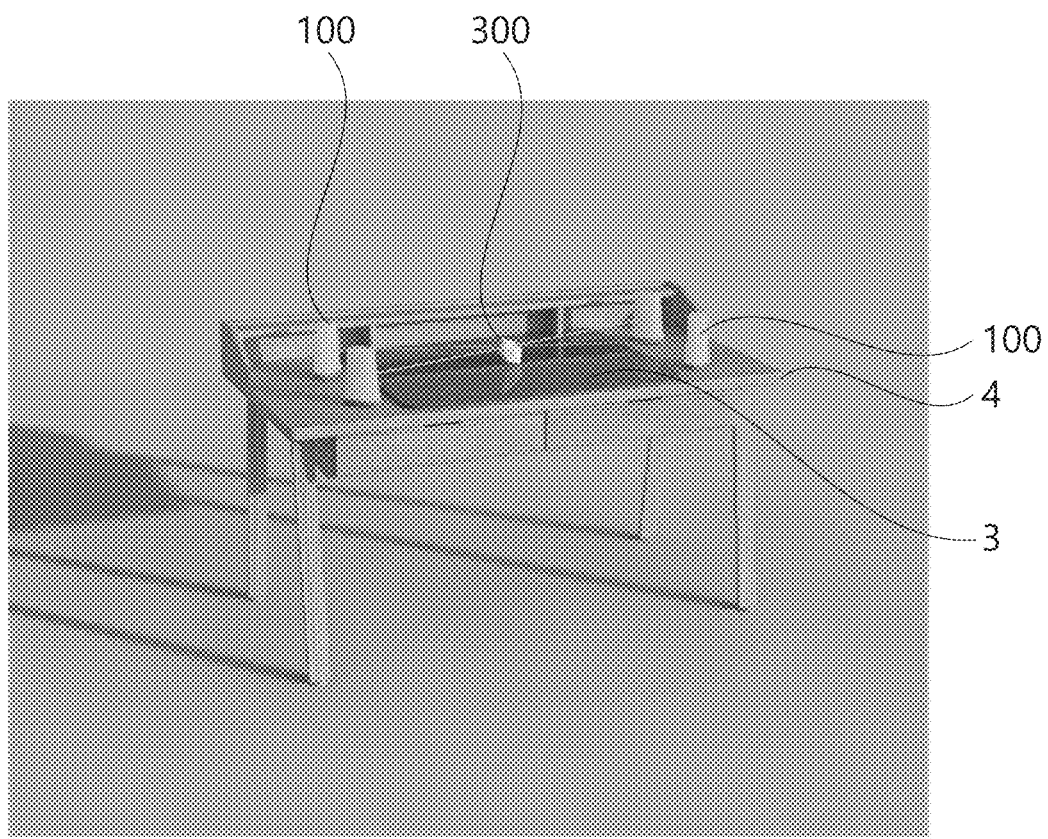
FIGS. 11c, 11d, and 11e are conceptual diagrams illustrating various forms in which cable driving modules are installed in a force feedback control apparatus according to one embodiment of the present disclosure.
Figure 11D:
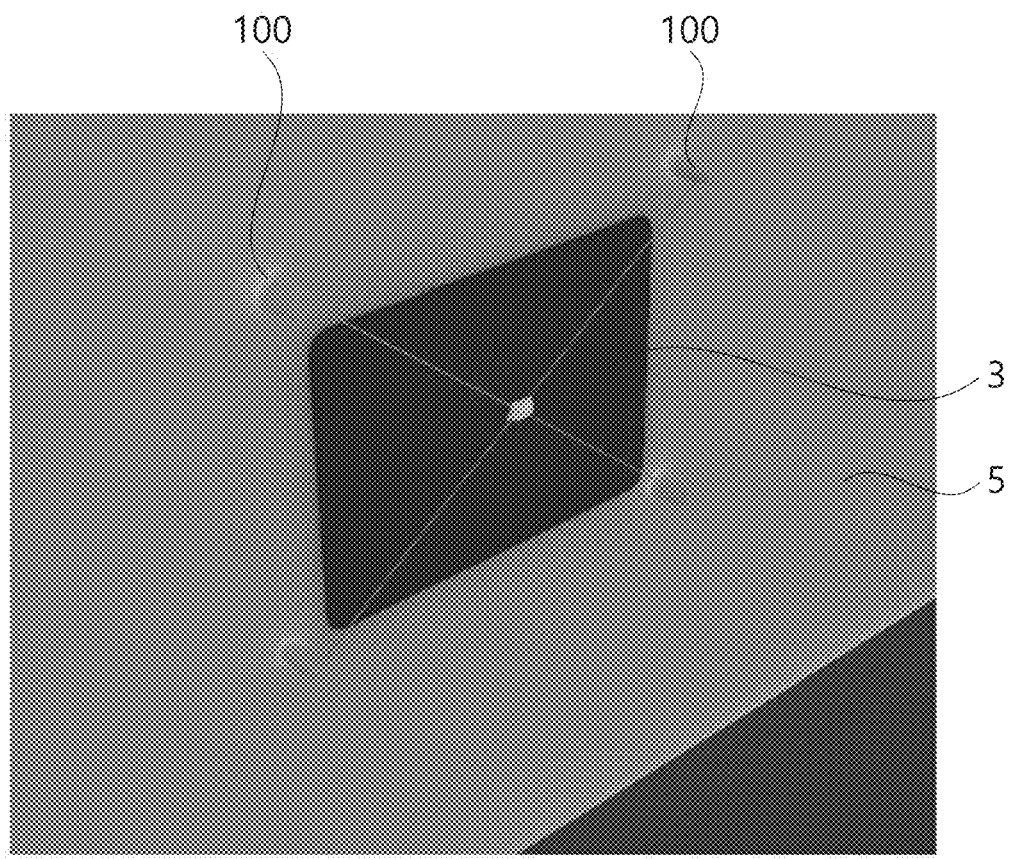
Figure 11E:
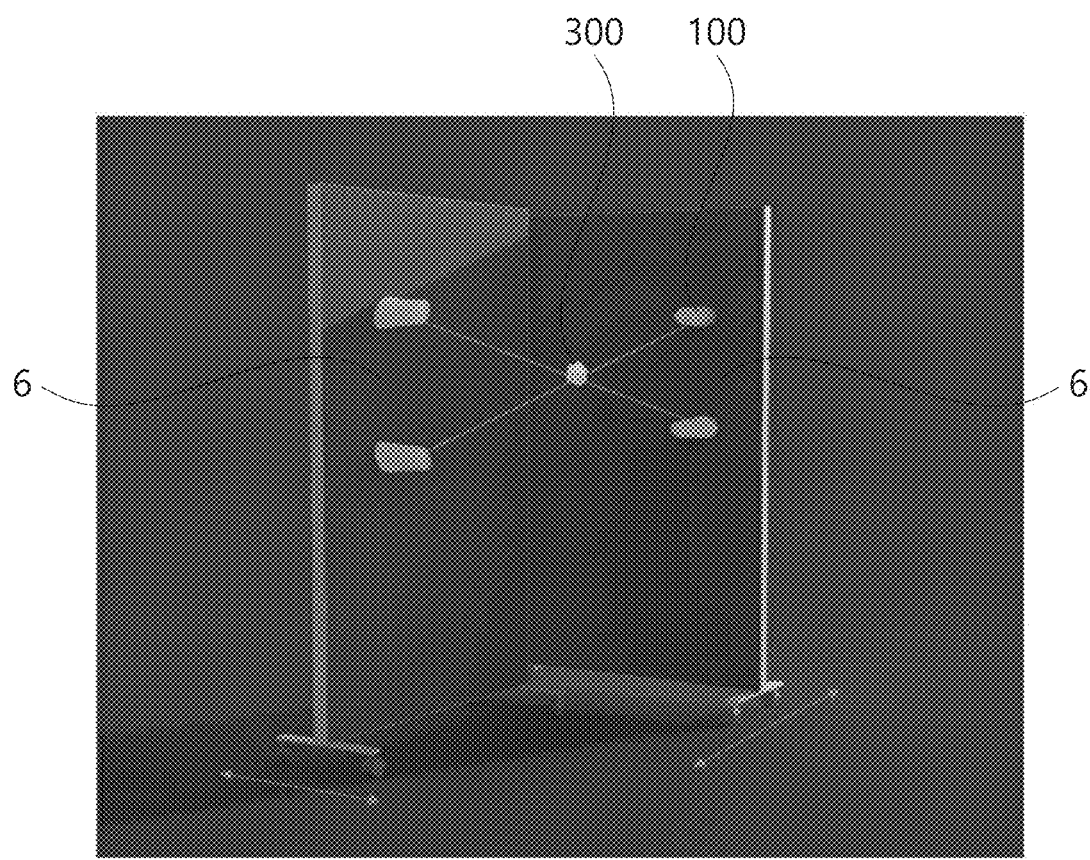

FIGS. 11c, 11d, and 11e are conceptual diagrams illustrating various forms in which cable driving modules are installed in a force feedback control apparatus according to one embodiment of the present disclosure.

In FIG. 11c, a force feedback control apparatus used with a display placed on a table is shown. Referring to FIG. 11c, the cable driving modules 100 of the force feedback control apparatus may be installed on the table 4 at a position close to the display 3. Also, the ends of the cables 410 pulled out from the respective cable driving modules 100 may be connected to the user interface device 300. Afterward, when the user moves the user interface device 300, the controller may determine the number and positions of the cable driving modules and complete the initial value setting.

When the force feedback control apparatus according to the present disclosure is used on a table as shown in FIG.

11c, the force feedback control apparatus may be used in conjunction with the education content, such as distance education and metaverse education. In addition, since it is easy to install and release the force feedback control apparatus, user convenience may be improved for students pursuing education, for example. In addition, since the initial value is automatically set after the force feedback control apparatus is installed, the force feedback control apparatus, according to the present disclosure, may reduce an installation burden on the user.

Referring to FIG. 11d, a force feedback control apparatus used in a wall-mount configuration is shown. As shown in the figure, the force feedback control apparatus according to the present disclosure is configured so that the cable driving modules 100 may be used with the display 3 provided on the wall 5; thus, the force feedback control apparatus may be used with exhibition contents in the science museums and art galleries.

Referring to FIG. 11e, a concept is illustrated in which a force feedback control apparatus is used in a variable environment. The cable driving modules 100 may be installed on each of the two mobile walls 6. In the present embodiment, the user may change the position of the mobile wall 6 where the force feedback control apparatus is installed; accordingly, the number and positions of the cable driving modules 100 may be automatically determined to set the initial values. At this time, the user interface device 300 may be positioned at a distance from the wall. The configuration above may be used by designers and artists in various ways for digital modeling or drawing and to facilitate interaction with a 3D virtual space.

On the other hand, although not shown in the figure, the force feedback control apparatus according to one embodiment of the present disclosure may operate without being restricted by the number and positions of the cable driving modules installed. Therefore, scalability may be improved since the user may arbitrarily install the force feedback control apparatus on various devices, such as smart pads, PC display devices, and large screens, and accurately perform force feedback-based haptic control.

In what follows, a control method for the force feedback control apparatus according to another embodiment of the present disclosure will be described with reference to FIGS. 12 and 13.

Figure 12:
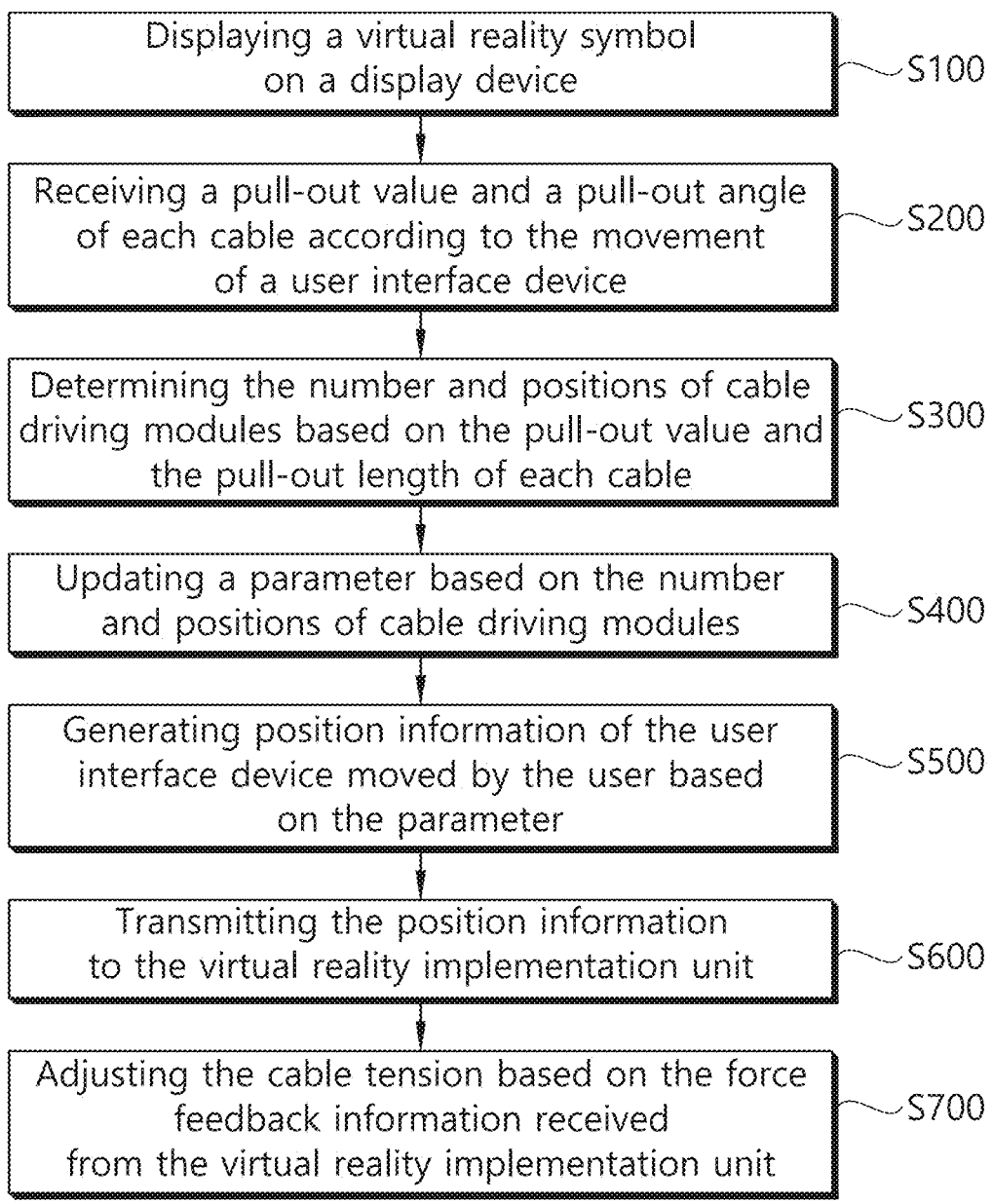
FIG. 12 is a flow diagram of a control method for a force feedback control apparatus according to another embodiment of the present disclosure.
Figure 13:
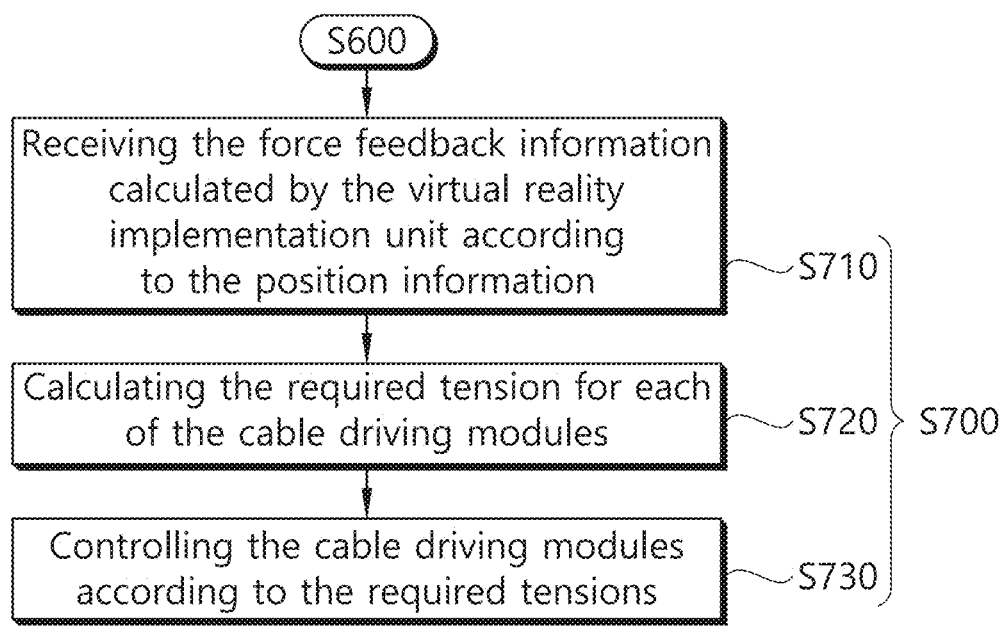
FIG. 13 is a detailed flow diagram illustrating a step of adjusting the tension of a cable based on force feedback information in a control method for a force feedback control apparatus according to another embodiment of the present disclosure.

FIG. 12 is a flow diagram of a control method for a force feedback control apparatus according to another embodiment of the present disclosure, and FIG. 13 is a detailed flow diagram illustrating a step of adjusting the tension of a cable based on force feedback information in a control method for a force feedback control apparatus according to another embodiment of the present disclosure.

In the following figures, it is assumed that the user attaches a plurality of cable driving modules at arbitrary positions. Also, the following steps may be performed to accommodate situations in which the user repositions the cable driving modules while operating the cable driving modules.

Referring to FIG. 12, a control method for a force feedback control apparatus according to another embodiment of the present disclosure may comprise displaying a virtual reality symbol on a display device S100, receiving the respective cable pull-out values due to movement of a user interface device S200, determining the number and positions of cable driving modules based on the cable pull-out values S300, updating a parameter based on the number and positions of the cable driving modules S400, generating position information of the user interface device based on the parameter S500, transmitting the position information to a virtual reality implementation unit S600, and adjusting the cable tension based on force feedback information received from the virtual reality implementation unit S700.

The displaying of the virtual reality symbol on the display device S100 is performed to determine the number and positions of cable driving modules when information on the number and positions of the cable driving modules is not received. The present step displays a guide path on the virtual reality using figures or lines and guides the user to move the user interface device along the guide path.

The receiving of the respective cable pull-out values due to movement of the user interface device S200 receives pull-out values from the respective cable driving modules when the user moves the user interface device along the guide path displayed on the display device. A controller may perform the present step by receiving the respective pull-out values from the cable driving modules when the user moves the user interface device.

The determining of the number and positions of cable driving modules based on the cable pull-out values S300 determines the number and positions of the cable driving modules by the controller based on the information received from the virtual reality implementation unit. When the guide path is defined as a path on a plane, the number and positions of a plurality of cable driving modules disposed on the plane may be determined. At this time, the controller may determine the number and positions of the cable driving modules based on the pull-out values of the respective cables and the amount of changes in the pull-out values as illustrated with reference to FIGS. 5 and 6.

The updating of the parameter based on the number and positions of the cable driving modules S400 determines a parameter for distributing the tensions to be generated by the respective cable driving modules, by which the controller determines the number and positions of the cable driving modules and subsequently implements a force feedback haptic function. At this time, a vector is formed, the elements of which represent the tensions to be exerted by the respective cables according to the positions of the corresponding cable driving modules, and parameters related to the respective elements of the vector may be updated.

The generating of the position information of the user interface device based on the parameter S500 is performed by the controller to apply the position information of the user interface device to the virtual reality when the user interface device is moved. When the user grabs and moves the user interface device based on the position information of each cable driving module, the position information of the user interface device may be generated based on the parameter.

In the transmitting of the position information to the virtual reality implementation unit S600, the controller provides the user input to the virtual reality. The controller generates the position information of the user interface device based on the parameter and transmits the generated position information to the virtual reality implementation unit. The virtual reality implementation unit moves the position of a proxy on the virtual reality based on the transmitted position information.

The adjusting of the cable tension based on the force feedback information received from the virtual reality implementation unit S700 finally delivers the force feedback generated in the virtual reality to the user.

Referring to FIG. 13 again, the adjusting of the cable tension based on the force feedback information received from the virtual reality implementation unit may include receiving force feedback information calculated by a virtual reality driving unit according to the position information S710, calculating required tensions for the respective cable driving modules S720, and controlling the cable driving modules according to the required tensions S730.

In the receiving of the force feedback information calculated by the virtual reality driving unit according to the position information S710, the controller determines the position of the user interface device based on the cable pull-out values received from the cable driving modules and the parameter. In the present step, the controller transmits the position information of the user interface device to the virtual reality driving unit. At this time, the virtual reality implementation unit synchronizes and updates the position of the proxy based on the position information, calculates force feedback applied at the proxy's current position, and transmits the calculated force feedback to the controller.

The calculating of the required tensions for the respective cable driving modules S720 determines the tensions to be generated by the controller for the respective cable driving modules based on the force feedback information received from the virtual reality driving unit and the parameter. The controller determines the tensions to be generated for the respective cable driving modules using an equation based on an updated parameter and generates a control input for each cable driving module.

In the controlling of the cable driving modules according to the required tensions S730, the control input generated by the controller is delivered to each cable driving module, and the tension of an actual cable is adjusted. The tensions exerted on the respective cables are combined by the user interface device to finally generate a force feedback-based haptic signal for the user interface device.

In the present embodiment, the displaying of the virtual reality symbol on the display device S100, the receiving of the respective cable pull-out values due to movement of the user interface device S200, the determining of the number and positions of cable driving modules based on the cable pull-out values S300, and the updating of the parameter based on the number and positions of the cable driving modules S400 may be performed until the initial information on the number and positions of the cable driving modules is determined. In other words, the steps above are related to the initial configuration.

The following steps comprising the generating of the position information of the user interface device based on the parameter S500, the transmitting of the position information to the virtual reality implementation unit S600, and the adjusting of the cable tension based on the force feedback information received from the virtual reality implementation unit S700 may be repeatedly and in real-time while an actual user interacts with the virtual reality.

In what follows, a modified example of the cable driving module according to the present disclosure will be described with reference to FIGS. 14 and 15b.

Figure 14:
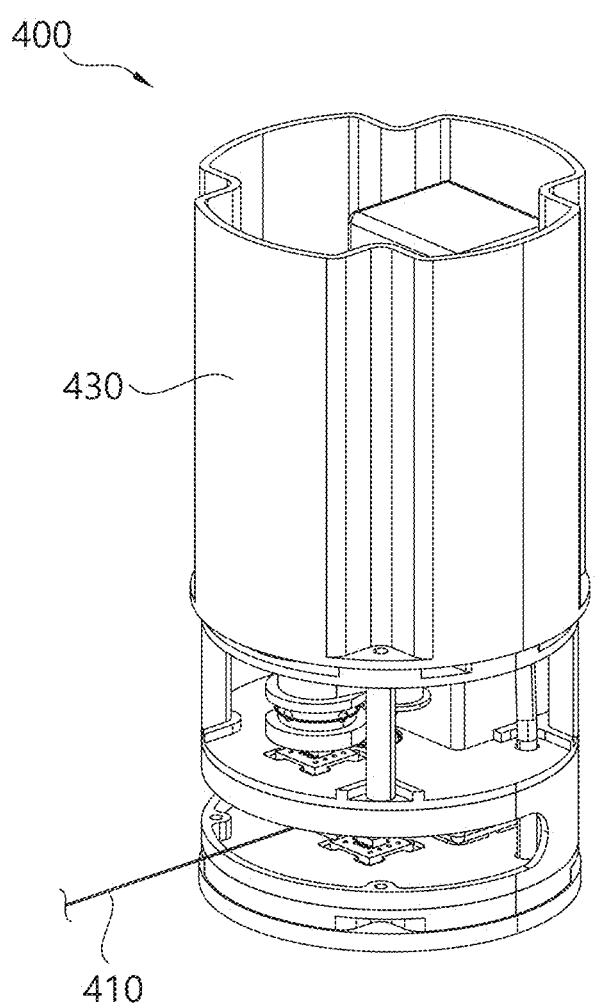
FIG. 14 is a modified example of a cable driving module included in one embodiment of the present disclosure.
Figure 15A:
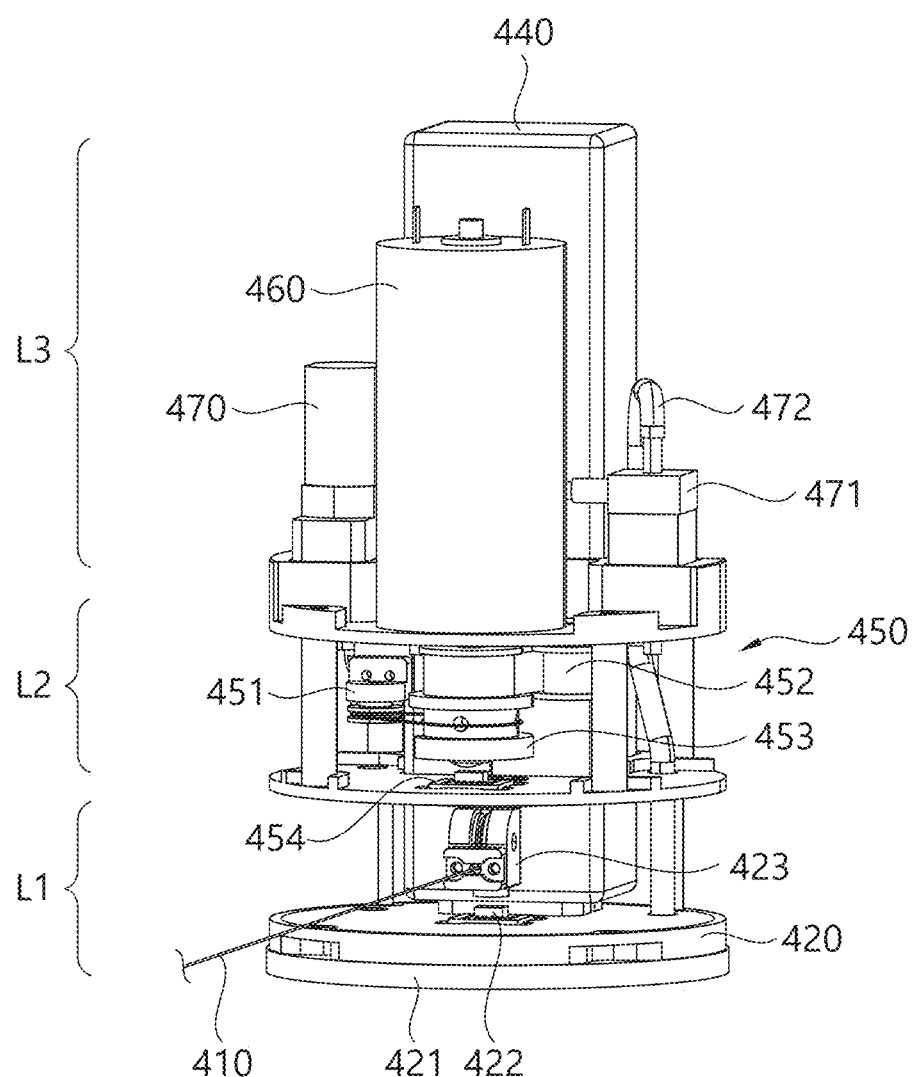
FIG. 15a is a perspective view of the cable driving module of FIG. 14 with a housing removed.
Figure 15B:
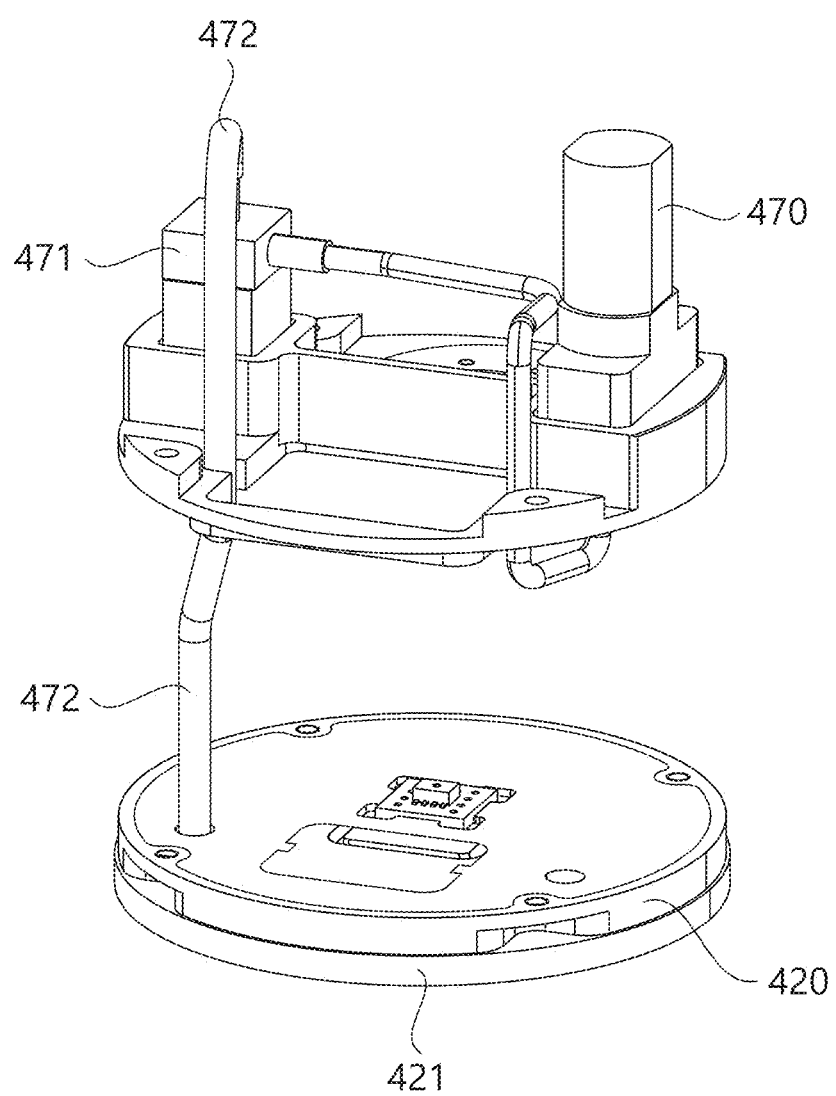
FIG. 15b is a perspective view showing pumps, valves, and tubes in the cable driving module of FIG. 14.

FIG. 14 is a modified example of a cable driving module included in one embodiment of the present disclosure, FIG. 15a is a perspective view of the cable driving module of FIG. 14 with a housing removed, and FIG. 15b is a perspective view showing pumps, valves, and tubes in the cable driving module of FIG. 14.

Referring to FIGS. 14, 15a, and 15b, a cable driving module 400 included in one embodiment of the present disclosure may be configured in various shapes different from the embodiment described in FIG. 1. For example, the cable driving module 400 may have a cylindrical shape. When the cable driving module 400 is configured to have a cylindrical shape, user convenience may be improved when the user grabs the cable driving module 400, and the aesthetic element may also be improved. The cable driving module 400 may include a base 420, a cover 430, a battery 440, a cable output unit 450, a driving unit 460, and a pump 470.

The base 420 may be provided with an attachment unit 421 that enables the lower surface of the base 420 to be attached to an external structure, such as a monitor bezel, a table, or a wall.

The cover 430 is configured to accommodate the base 420 together with the battery 440, the cable output unit 450, the driving unit 460, and the pump 470 to be described later.

The battery 440 may be configured to supply power to those elements, such as the driving unit 460 installed in the cable driving module 400, the pump 470, the valve 471, the first encoder 422, and the second encoder 454. The battery may be provided compactly within the cable driving module; for example, the battery may be installed to extend vertically from a position biased to one side within the cable driving module.

In the present embodiment, the cable driving module may be composed of three stages in the vertical direction. At the lowest stage L1, the cable 410 is pulled out from the cable driving module 100, and the sidewall of the base 420 has an elongated hole along the circumferential direction with a predetermined angle to prevent interference with the base when the cable pulling direction changes. The cable 410 may be pulled out of the cable driving module 400 through the elongated hole. The base may include a cable guide 423 that may freely rotate according to the cable pull-out direction. Also, the first stage L1 is configured to have the first encoder 422 to measure the rotation angle of the cable guide 423, and the control unit may determine the pull-out direction of the cable 410 based on the value sensed by the first encoder 422.

The cable output unit 450 installed in the second stage L2 may include the roller 451, the spring drum 452, the cable spool 453, and the second encoder 454. The roller 451 may be configured to change the direction of the cable 410 pulled out from or wound around the driving unit 460. One side of the cable spool 453 may be configured to support the cable 410. The cable spool 453 is configured to rotate together with the cable 410 when the cable 410 is pulled out or wound. The other side of the cable spool 453 may be connected to the spring drum 452 by a spring. The spring may apply a constant torque to the cable spool 453. Accordingly, even when the driving unit 460 is not operating, an appropriate amount of tension may be applied to the cable. In other words, there is no need to continuously operate the driving unit 460 to exert a constant level of tension on the cable 410. The second encoder 454 is coupled to the end of the cable spool 453 and is configured to calculate the length of the cable pulled out by measuring the rotation angle.

The driving unit 460 may be provided in the third stage L3 to adjust the tension and the pull-out length of the cable. The size of the driving unit 460 may vary according to the tension required by the cable driving module; accordingly, the height of the third stage L3 may increase, or the overall outer diameter of the cable driving module 400 may increase.

The third stage may include the pump 470 and the valve 471. One side of the tube 472 passes through the base and is configured to let the fluid flow to and from the attachment unit 421 on the lower side of the base 420, and the other side of the tube 472 may be connected to the pump 470 installed in the third stage. The pump 470 may be configured to maintain the cable driving module 400 to be attached to an external structure by providing negative pressure to the inside of the attachment unit 421. Also, the valve 471 may be provided to maintain the negative pressure supplied to the attachment unit 421.

Meanwhile, FIGS. 14 to 15b omit a cushion unit to improve the grip feel and convenience when the user grabs the force feedback control apparatus. Although not shown in the figure, the cushion unit may be composed of various materials in various shapes that improve user convenience and aesthetics.

As described above, the force feedback control apparatus and a control method for the apparatus according to the present disclosure may freely determine and fix the positions of cable driving modules and automatically detect the positions of the cable driving modules even if the user does not provide the information on the positions, thereby achieving scalability for various application targets. In addition, since the present disclosure enables accurate force feedback, an advantageous effect of enhancing the user's sense of reality and immersion may be obtained.

What is claimed is:

1. A force feedback control apparatus, comprising:
   a plurality of cable driving modules comprising at least three modules, wherein each of the plurality of cable driving modules is configured to wind a portion of a cable around one side and adjust a tension of the cable pulled out;
   a user interface device configured to be connected to an end of each of the cables pulled out from the plurality of cable driving modules; and
   a controller for determining the number and positions of the plurality of cable driving modules based on a pull-out value from each of the plurality of cable driving modules when a position of the user interface device is moved by a user's manipulation,
   wherein each of the plurality of cable driving modules comprises a first sensor unit configured to detect the pull-out value of the cable and a second sensor unit configured to detect a pull-out direction of the cable,
   wherein the controller is configured to determine parameters based on the pull-out direction and a pull-out length of the cable based on values received from the first sensor unit and the second sensor unit, and
   wherein each of the plurality of cable driving modules includes:
   a first pulley configured to wind the cable;
   a second pulley configured to change a direction of the cable pulled out from the first pulley;
   a motor configured to rotate the first pulley;
   a constant torque spring configured to apply a predetermined torque to the first pulley; and
   a communication module configured to communicate with the controller.

2. The force feedback control apparatus of claim 1, wherein the plurality of cable driving modules include a fixing unit configured to be attached to an arbitrary external structure by the user.

3. The force feedback control apparatus of claim 2, wherein the controller is configured to change the parameters for force feedback according to the determined number and positions of the plurality of cable driving modules.

4. The force feedback control apparatus of claim 3, wherein the controller is configured to control a driving unit for adjusting the tension of each cable driving module based on the changed parameters.

5. The force feedback control apparatus of claim 4, wherein the controller is configured to transmit position information of the user interface device to a virtual reality implementation unit based on the parameters and a value received from each of the plurality of cable driving modules.

6. The force feedback control apparatus of claim 5, wherein the controller is configured to receive force feedback information calculated based on the position information of the user interface device in the virtual reality implementation unit,
   calculate a required tension to be generated for each of the plurality of cable driving modules based on the force feedback information, and
   transmit the required tension to each of the plurality of cable driving modules.

7. The force feedback control apparatus of claim 6, wherein the controller is configured to perform, in real-time, transmission of the position information of the user interface device, reception of the force feedback information, and calculation and transmission of the required tension to be generated.

8. The force feedback control apparatus of claim 7, wherein the controller is configured to calculate two-dimensional coordinates of each of the plurality of cable driving modules or coordinates in a three-dimensional space when the plurality of cable driving modules are disposed at arbitrary positions.

9. The force feedback control apparatus of claim 2, wherein the user interface device is configured to include a color sensor, and the controller is configured to determine coordinates of the user interface device based on a value received from the color sensor.

10. The force feedback control apparatus of claim 1, wherein each of the plurality of cable driving modules includes an accelerometer, and the controller is configured to determine the pull-out direction of the cable based on a direction of gravity measured by the accelerometer and a value measured by the second sensor unit.

11. A control method for a force feedback control apparatus, the method comprising:
   displaying a virtual reality symbol on a display apparatus;
   receiving information related to a pull-out direction and a pull-out length of a cable from each of cable driving modules when a user manipulates a user interface device according to the virtual reality symbol; and
   determining the number and positions of the cable driving modules based on the information related to the pull-out direction and the pull-out length of the cable,
   wherein each of the cable driving modules includes:
   a first pulley configured to wind the cable;
   a second pulley configured to change a direction of the cable pulled out from the first pulley;
   a motor configured to rotate the first pulley;
   a constant torque spring configured to apply a predetermined torque to the first pulley; and
   a communication module configured to communicate with a controller.

12. The control method of claim 11, wherein the determining of the number and positions of the cable driving modules is performed based on the number and positions of the cable driving modules disposed arbitrarily by the user.

13. The control method of claim 12, wherein the pull-out direction of the cable is determined based on information on a direction of gravity received from an accelerometer installed in the cable driving module and a value received from an angle sensor installed in the cable driving module.

14. The control method of claim 13, further comprising:
updating a parameter for controlling each of the cable driving modules based on the number and positions of the cable driving modules.

15. The control method of claim 14, further comprising:
receiving a cable pull-out value from each of the cable driving modules as the user manipulates the user interface device and generating position information of the user interface device based on the parameter; and
transmitting the position information to a virtual reality implementation unit.

16. The control method of claim 15, wherein the controlling each of the cable driving modules includes:
receiving force feedback information calculated by the virtual reality implementation unit according to the position information;
calculating a required tension for each of the cable driving modules; and
controlling the cable driving modules according to the required tension.

17. The control method of claim 16, wherein the generating of the position information of the user interface device and adjusting a tension of each cable based on the force feedback information are performed iteratively in real-time.

* * * * *